May 27, 1952 G. KUNZ 2,598,001
ROCKET LAUNCHER
Filed July 19, 1948 4 Sheets-Sheet 1
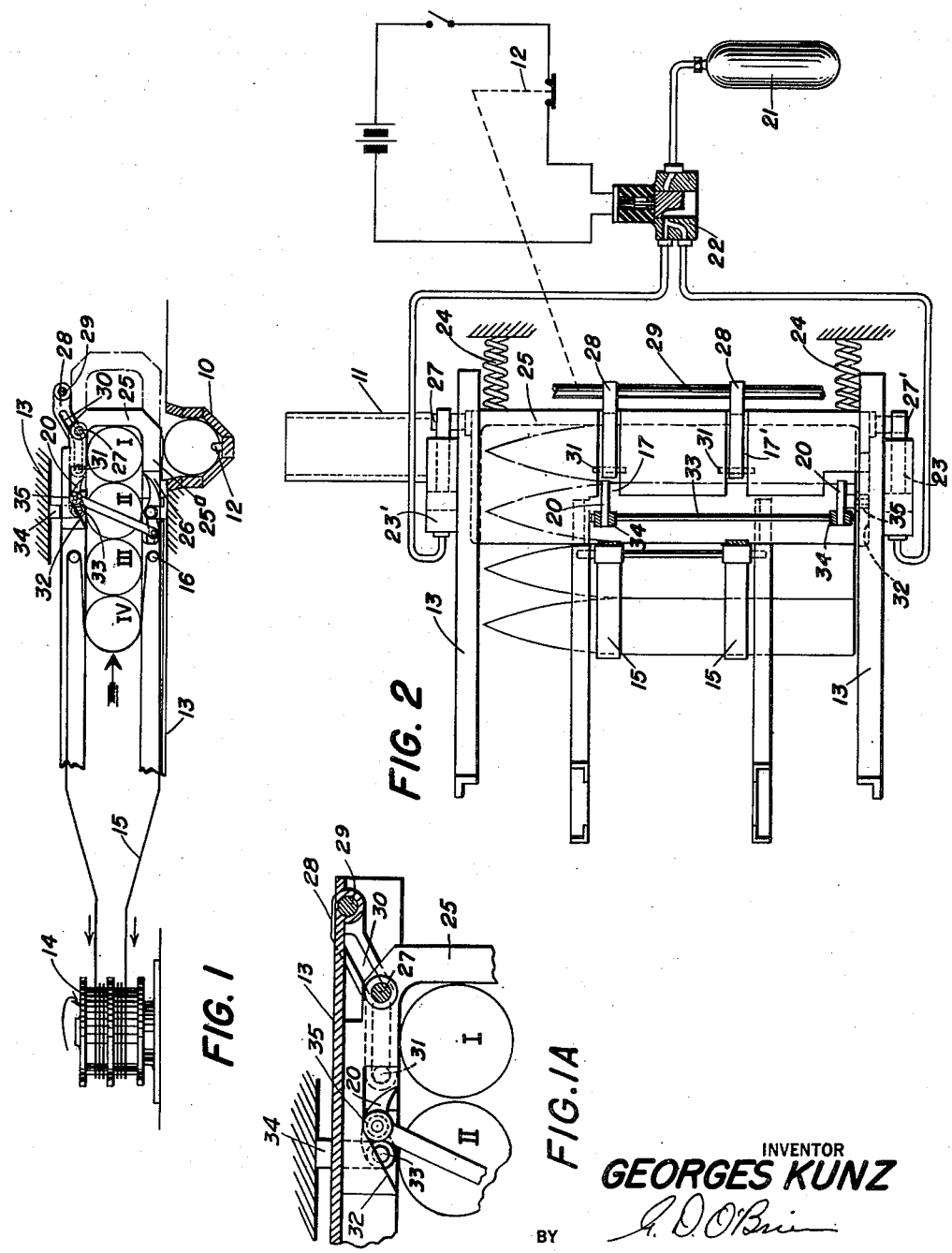
INVENTOR
GEORGES KUNZ
BY
ATTORNEY May 27, 1952 G. KUNZ 2,598,001
ROCKET LAUNCHER
Filed July 19, 1948 4 Sheets-Sheet 2

INVENTOR
GEORGES KUNZ
BY
ATTORNEY

May 27, 1952 G. KUNZ 2,598,001
ROCKET LAUNCHER
Filed July 19, 1948 4 Sheets-Sheet 3

May 27, 1952     G. KUNZ     2,598,001
ROCKET LAUNCHER

Filed July 19, 1948     4 Sheets—Sheet 4

INVENTOR
GEORGES KUNZ
BY
ATTORNEY

Patented May 27, 1952

2,598,001

UNITED STATES PATENT OFFICE 2,598,001

ROCKET LAUNCHER

Georges Kunz, Washington, D. C., assignor to the United States of America as represented by the Secretary of the Navy Application July 19, 1948, Serial No. 39,458

8 Claims. (Cl. 89—1.7)

The present invention relates to rocket launchers and more particularly to rocket launchers adapted for installation in an aircraft for firing a series of rocket projectiles in rapid succession.

It has been the known practice prior to this invention to utilize separate rocket mountings under the wings of an aircraft for each rocket to be fired. The disadvantage of this construction is that the rockets to be fired and their individual mountings are all exposed and thereby increase considerably the drag on the aircraft, and such constitution amounts to inefficient use of the rocket launcher since it is utilized for firing but a single rocket. In accordance with the present invention a number of rockets are stored in a magazine communicating with the firing chamber and the feed of these rockets into the launcher is made automatic with the firing of the rockets. In this manner the rockets are fired rapidly and the magazine can be placed within the fuselage or airfoil or may be otherwise aerodynamically streamlined. Accordingly, only a portion of the firing guides or launching tube is exposed and constitutes the only member of the rocket launcher adding to aerodynamic drag.

One of the principal and basic features of this invention resides in the use of a cable for advancing the rockets in the magazine in a direction normal to their longitudinal axis and into the firing chamber, the said cable being wound on a spring actuated drum. Also a principal feature of this invention involves the utilization of a pneumatic actuated piston with solenoid controlled valves for actuating the transfer mechanism and for automatically actuating the holding pawls for the rocket projectiles thereby permitting the rockets to be advanced by the cable in the direction normal to their longitudinal axis into the launching position. By utilizing solenoid actuating valves for controlling the admission of air pressure to the pneumatically actuated pistons for operating the transfer mechanism, the loading of the rockets from the magazine into the firing position can be made automatic with the firing of the rockets. Mechanical and electrical interlocks are provided for the purpose of avoiding possible jamming of the rockets and for effecting movement from the magazine to the launcher of but a single rocket and at the same time retaining the remaining rockets in the magazine in position for successive firing.

Accordingly, it is an object of this invention to provide a new and improved rocket launcher for automatically loading rockets from an adjacent communicating magazine into a firing chamber whereby to provide an automatic rocket launcher.

It is a further object of this invention to provide a rocket launcher wherein the rockets are advanced automatically in the magazine into firing position by means of electrically controlled pneumatic pistons. It is a still further object of this invention to provide a belt or cable feed for rockets in a magazine of a rocket launcher.

It is also a further object of this invention to provide a rocket launcher and magazine therefor that may be readily adapted to aircraft installation.

Other objects and many of the attendant advantages of this invention will be readily appreciated as the same becomes better understood by reference to the following detailed description when considered in connection with the accompanying drawings, wherein;

Fig. 1 is a partially diagrammatic and sectional elevation of a preferred embodiment of this invention showing four rockets in the magazine and one rocket in the launcher in a position ready for firing;

Fig. 1a is a slightly enlarged view of a portion of Fig. 1, illustrating the pawl operating structure somewhat more clearly;

Fig. 2 is a diagrammatic plan view of the rocket launcher illustrated in Fig. 1 showing the electric circuit connections for controlling the solenoid-actuated valve;

Figure 4:
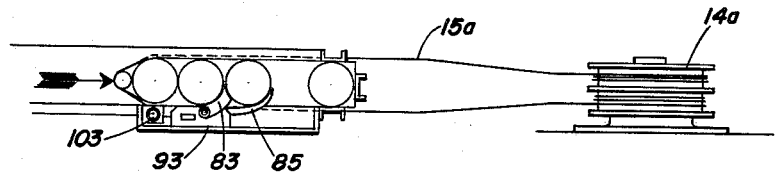
Fig. 4 is a diagrammatic elevation of the structure involved in Fig. 3.

Referring now to the drawings and more particularly to the modification illustrated in Figs. 1 and 2 there is shown a frame 10 constituting a firing chamber for receiving a rocket from a communicating magazine into position from which it is launched. A launching tube 11 and a guide 13 are rigidly attached to the framework 10, the guide 13 comprises a part of the magazine for the rockets I, II, III, and IV, as illustrated in the drawings and contains the guide sheaves 16 about which a cable belt 15 is passed, which cable partially encircles the last rocket (IV) in the magazine and is wound upon the drum 14. The drum 14 is preferably springtensioned in the direction indicated by the arrows so that the cable 15 will be wound upon the drum as each of the rockets is individually advanced into the framework 10.

The U-shaped member 25 hereinafter referred to as a slide, since it is slidably supported in the frame 13, closes the end of the magazine opposite the drum 14 and functions to permit each rocket contained within the magazine to be transmitted in turn into the firing chamber 10. As illustrated in Fig. 2 this slide 25 is supported for movement in the frame 13 and is biased by means of the springs 24 into a position wherein the lateral surface 25a of the slide serves as a closure for the firing chamber. The slide 25 is moved in a direction to the right as viewed in the drawings by means of a pair of pneumatic motors 23 and 23' to bring the opening 26 formed in the side 25a into registry with the open side of the firing chamber 10. As illustrated, the pistons for the pneumatic motors 23 and 23' are connected to the extensions 27 and 27' formed on the opposite ends of the slide so that as the pistons are moved within the cylinders the slide will be moved to the right compressing the spring 24. The slide is provided also with a pair of slots 17 and 17' extending transversely thereof to receive the pivoted actuating leading-rocket pusher pawls 28. The pawls 28 are secured in spaced-apart relation on the rod 29 which is pivoted in the frame 13 of the rocket launcher. Each of the actuating pawls 28 has a slotted cam surface 30 cut therethrough for receiving the pins 31 which are rigidly secured to the slide 25 at the slots 17 and 17' so as to project therethrough. A pair of holding pawls 20 is supported by a common shaft 33 which is in turn supported by bearings 34 on a part of the frame 13. These pawls are actuated by the cam 32 as the slide is moved by the pneumatic motors. As the roller 35, carried by one of the pawls (Fig. 2), moves over the cam surface the pawls are pushed inwardly of the slide to engage the second rocket II within the magazine and to prevent this rocket from being moved by the cable belt into position for transfer into the guideway or firing track until rocket I has been so positioned.

As illustrated in Fig. 1, when a rocket is positioned for firing within the chamber 10 the rocket engages a projection pin 12. The frame of the chamber 10 carries suitable electric contacts (not shown) for completing a firing circuit when the rocket is so positioned. On firing this rocket the pin 12 is freed from engagement with the frame by spring pressure and moves inwardly of the frame by spring pressure (for example) to complete the energizing circuit for the solenoid-actuated valve 22. On energizing the solenoid the valve piston is moved into position communicating the exit ports of the valve with the compressed air flask 21. This admits high pressure air to the working side of the pistons of the pneumatic motors 23 and 23'. These pistons being fastened to the slide 25 suddenly push the slide-way from the rocket I (the inertia of the rocket being sufficient to prevent it from moving with the slide) and bring the opening 26 on the under side of the shank of the slide into registry with the open side of the firing chamber 10. In the first phase of the motion of the slide 25 the pawls 20 are controlled by the cam 32 so that the pawls 20 are pushed inwardly of the slide to engage the next projectile II. In the second phase of the motion of the slide 25, the pins 31 bear against that portion of the cam slot 30 to force the pawls 28 inwardly to kick rocket I out of its position in the magazine through the slide opening 26 and into the firing chamber 10. As the rocket is pushed into the firing chamber, it engages the projecting pin 12 moving this pin against its spring pressure to open the energizing circuit for the solenoid valve 22. The deenergization of the solenoid permits the piston valve to be returned to the position blocking the port leading from the air flask 21 and exposing the ports leading from the pneumatic motor 23 to atmospheric exhaust. Thus the slide is free to be moved by the springs 24 back to its initial position to cover the open side of the guideway or firing chamber 10, and to cause the cam surface 32 to release the pawls 20 from their position of engagement with the second rocket. Accordingly, the second rocket will be advanced in the direction indicated by the arrow, a distance equal to its diameter by means of the drum 14 and cable 15 whereby rocket II is in position for transfer to the firing chamber as soon as the rocket within the firing chamber has been fired.

From what has been stated, it will be clear that the series of rockets occupies the magazine at one side of and in a plane above the firing chamber 10, the leading rocket being supported above the firing chamber by the electro-pneumatically controlled slide 25. When the latter is displaced from beneath the leading rocket, the tendency of the latter to gravitate into the firing chamber is assisted by the push imparted by the kick-out pawls 28. The leading rocket is thus displaced in one direction laterally of a series of rockets for entry into the firing chamber and, upon being fired, is displaced in another direction with respect to the rocket series.

Attention is next directed to the modification which, it will be observed, carries out the general principles previously described. The parts which are the same as those appearing in the first form of the invention are identified by corresponding reference characters supplemented with the exponent $a$. Again, the rockets are stored in a magazine from which they are discharged one by one by operation of a double-lever linkage consisting of a main lever 75 and an auxiliary lever 76. The main lever is pivoted at 77. It has a fork 78 located medially of its ends, and a rounded head 79 at that terminal opposite to where the two levers are pivotally connected at 80. The arcuate movements of the levers are provided for by a slot 81 at the pivot 80. The remaining terminal of the auxiliary lever has a rounded head 82.

These rounded heads operate upon pawls 83, 84 which, when the double lever is actuated in the proper manner, exert forward pressure on the leading rocket, in addition to the continuous push exerted on the series of rockets by the spring-loaded drum, thereby separating the leading rocket from the series in the direction of progress of the series and advancing it directly into registration with the firing tube or track.

The structure of the pawl 84 is more simple than that of the pawl 83, the reason being that the pawl 83 has working in conjunction with it an automatic release device which initially holds a retainer arm 85 in a locking position against the front of the leading rocket of the series. Reference is again made presently to the pawl 84, but at this point attention is directed to the pawl 83.

A slide 86 has a recess 87, usually rectangular, in which the rounded head 79 has a working fit, free from excessive idle relative motion. The slide has a lug 88 extending off to one side. This lug has a hole 89 in which the short arm 90 of a bell-crank 91 is movable, the sides of the short arm being in working contact with the adjacent walls of the hole. The slide is movable back and forth by the rocking of the main lever 75, and this rocking causes a sympathetic rocking of the bell-crank 91.

The foregoing movement of the slide 86 occurs in an opening 92 which is outlined by parts of a carriage 93 and a bracket 94 which fits down on the carriage to confine the several moving parts which occupy its confines. The breadth of the opening 92 exceeds the breadth of the slide 86 by a small amount, enough to confine the bell-crank 91 to a predetermined amplitude of rocking motion. The end walls of the opening 92 therefore limit the movement of the slide.

The formations of the carriage and its covering bracket 94 define in part a passageway 95. A cam block 96 has a sliding fit in this passageway. The cam block has a hole 97 which is flared at 98 to accommodate the long arm 99 of the bell-crank. As the latter is made to rock, movements of the cam block 96 occur in response, it being noted that the bell-crank translates the movements of the slide 86 in one direction to movements of the cam block in a direction at right angles.

A cam 100, upstanding from the inner end of the block 96, initially underlies the retainer arm 85, actually assuming a position beneath the solid part designated 101 but adapted to be displaced from that position into line with a slot 102 in the arm 85. Said arm is pivoted at 103 to a fixed part 104 of the framing, the pivoting occurring at one of its ends, leaving the other and hooked end free to swing up and down into and away from engagement with the leading rocket. Thus, while the point of the cam 100 underlies the solid part 101 the arm 85 is supported in its up position, but when the cam is moved into registration with the slot 102 as when the block 96 is slid inwardly, the arm loses its support and thereupon moves to the rocket disengaging position.

The constantly present push prevailing on the trailing rocket causes the series to follow the leading rocket which is individually advanced in the following manner. The pawl 83, pivoted at 106 between ears of the bracket 94, is held erect in position behind the leading rocket by a spring 107. As the lever 75 keeps swinging toward the right, the carriage 93 carries the pawl 83 with it, thus positively displacing the leading rocket toward the firing tube. The pawl 84 is pivotally mounted and spring-erected similarly to the pawl 83, and it responds to the swinging of the auxiliary lever 76 precisely as described for the lever 75. The rocket series follows by force of the cable and its spring-loaded drum.

Figure 5:
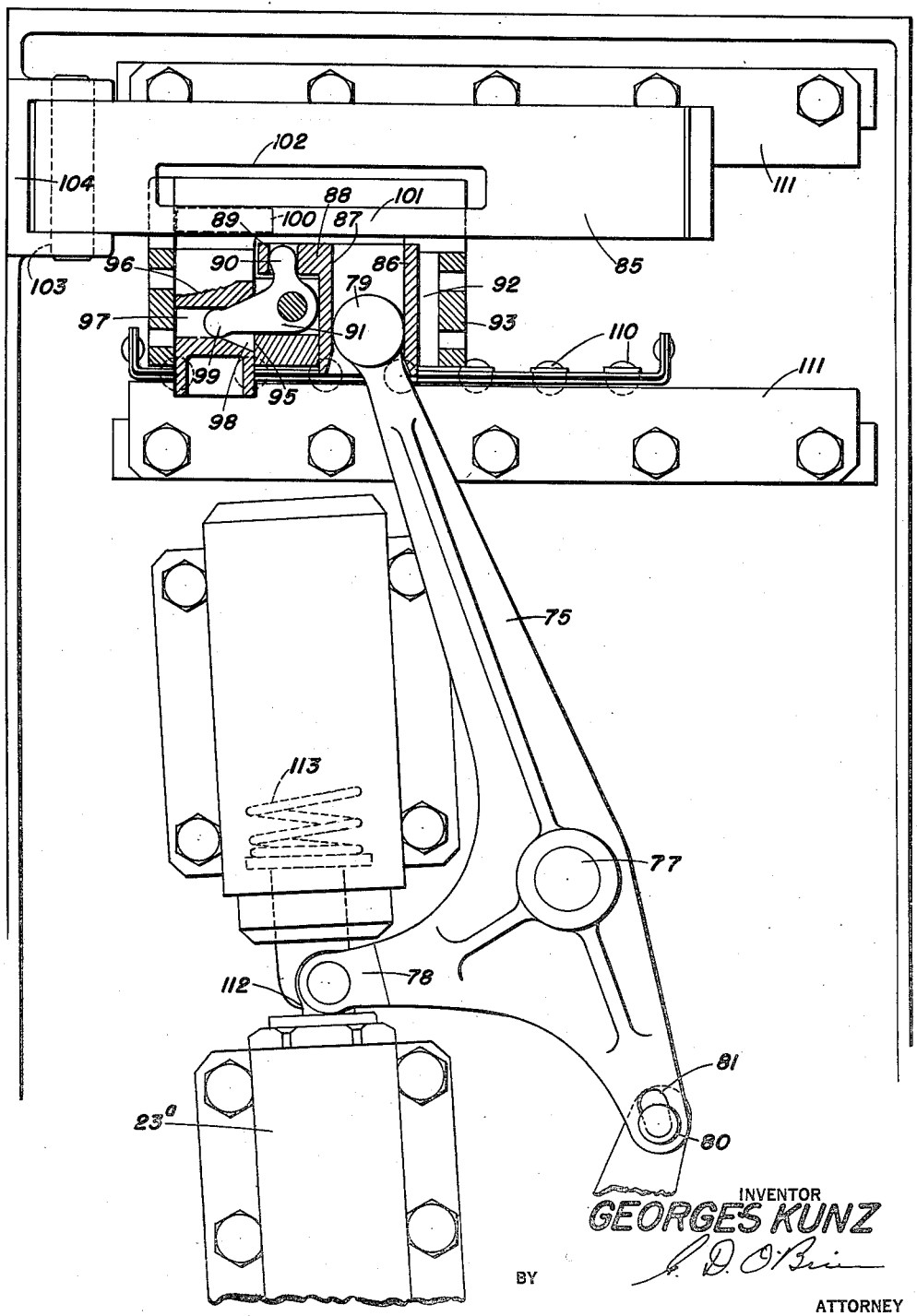
Fig. 5 is a partially plan and sectional view of a portion of the structure in Fig. 3.

During that period of movement of the carriage, the cam 100 rides in the slot 102 until it reaches an incline 108 at the forward end of the slot. The terminal movement of the carriage is sufficient to perform cam action whereby the arm 85 is restored to its elevated position to catch the next leading rocket of the advanced series. Upon the return swing of the main lever 75 the first step is to move the slide 86 (Fig. 5) to the left. This causes a counter-turn of the bell-crank 91 and retraction of the block 96. The cam 100 is thereby retracted into line with the solid part 101. As the lever continues its return swing, the point of the cam rides the underside of the arm 85 and then the solid part 101, keeping the arm elevated until the beginning of the next discharging cycle.

Reverting again to the pawl 84, this pawl is mounted on a carriage 109 similar to the carriage 93. Each of the carriages has a ball-bearing mount 110 in the rails 111 of a fixed track. As the main lever 75 swings in the manner described, motion is imparted thereby to the auxiliary lever 76. The motions of the two levers advance and retract the pawls 83, 84 simultaneously so that the leading rocket is expelled and the next one caught as has been brought out.

Figure 3:
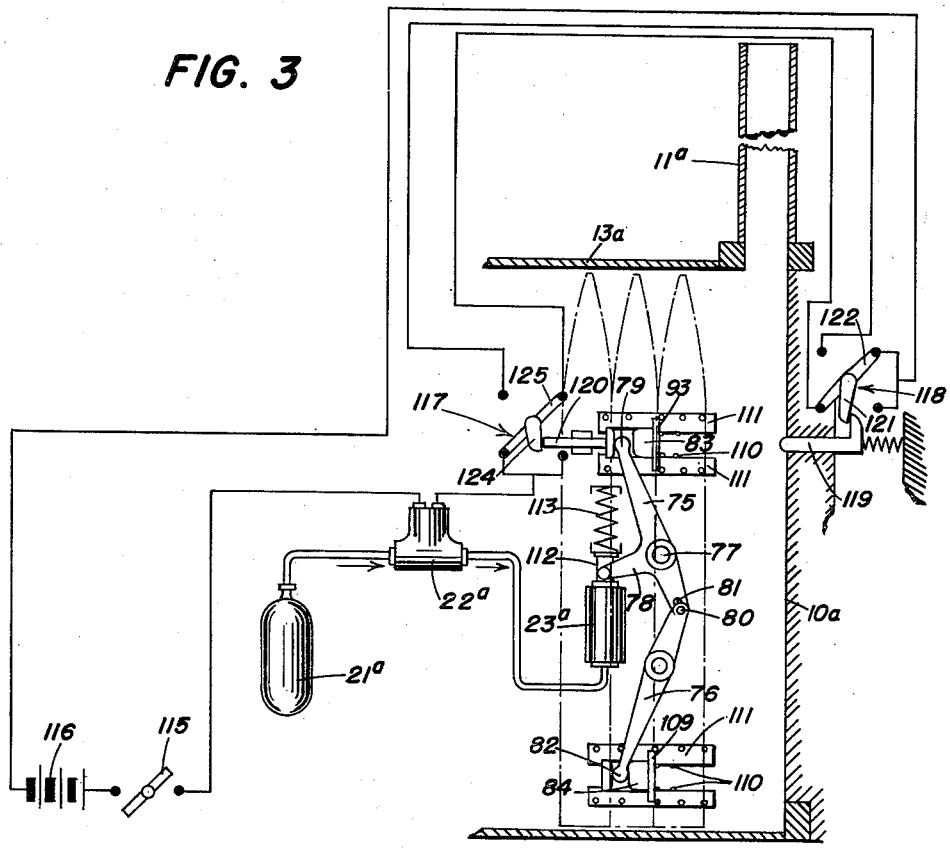
Fig. 3 is a diagram illustrating the mechanical and electrical features of a modified form of the invention.
Figure 6:
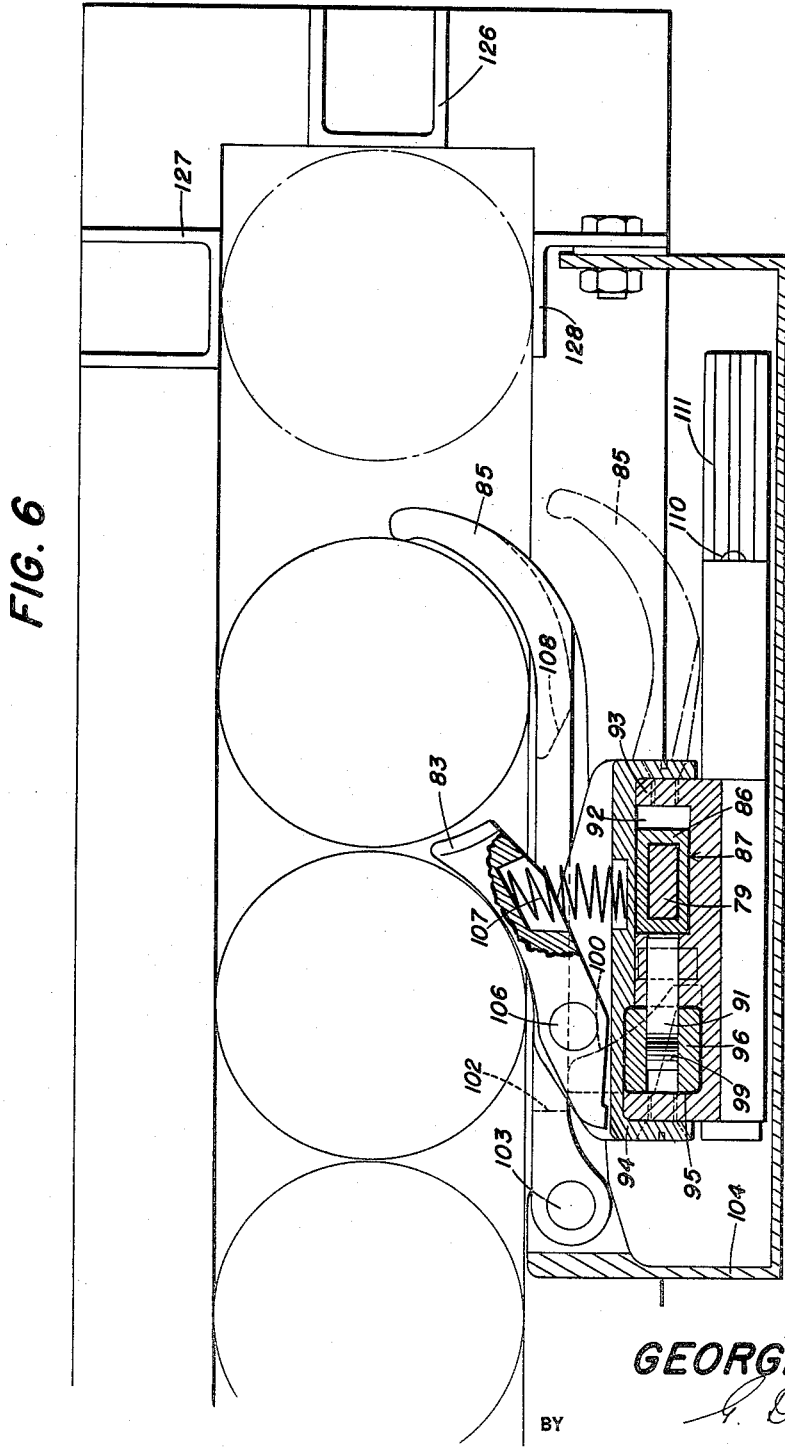
Fig. 6 is a sectional view of a portion of Fig. 5.

It is to be noted that the pawls 83, 84 perform an important function in addition to pushing the leading rocket forwardly of the series and into line with the firing tube 11a. They serve as guides for the inner side of the leading rocket during the initial period of firing. Guidance for the outermost, upper and lower sides of the leading rocket is provided by the rails 126, 127 and 128 (Fig. 6) forming part of the magazine. These rails are fixed and can always be relied upon to provide the required guidance for the three sides of the rocket. But it is also necessary to guide that side of the rocket which faces the magazine, and this guidance is supplied by the pushing pawls 83, 84. Therefore, to carry out the intended purpose, the pawls 83, 84 will stop in substantial registration with the left side of the firing tube 11a (Fig. 3), completing an equidistantly spaced, annular four-point guide for the rocket in line with the firing tube.

Power for the operation of the levers is derived from the piston 112 of a pneumatic cylinder 23a. The main lever 75 is coupled with the piston 112, and as air pressure is admitted to the cylinder the displacement of the piston imparts the power stroke to the main lever. The reaction of a spring 113 causes the return stroke of both the piston and the double lever.

A valve 22a admits air to the cylinder 23a from a flask 21a. The operation of the parts involved from here on is as follows. A switch 115 is adapted to be manually closed in order to start the working cycle. The closure of an electrical circuit from the source of current 116 through the electro-pneumatic valve 22a and switches 117 and 118 opens the valve to admit air to the cylinder 23a with the result already described.

When the leading rocket enters the firing tube it displaces the spring-bolt 119 by which means the switch 118 is prepared for breaking the circuit. The firing of the rocket is accomplished electrically by means of a contact ring at the rear of the projectile. The firing circuit may be of any known kind and for that reason is not detailed herein.

As soon as the firing has taken place and the base of the rocket has passed the spring-bolt 119, this bolt springs back engaging the lug 121 which followed the spring-bolt, and breaking the circuit to the electro-pneumatic valve 22a. At the same time the lug 121 ratchets the switch arm 122 around to a position 90° displaced from the position illustrated. In this position a new circuit is readied. The deenergization of the solenoid allows said valve 22a to release the compression of air in the cylinder 23a, permitting the spring 113 to return the parts to the former position.

The spring mounted pawls 83 and 84 are deflected by the next leading rocket on the return stroke, but spring back into position under that rocket to grip it. At the end position of its motion pawl 83 pushes a spring pin 120 into engagement with the lug 124, causing the switch arm 125 to be ratcheted to a position 90° displaced from the position illustrated. In this new position of the switch arm 125 continuity of the solenoid energizing circuit is again established to continue with another loading cycle.

Obviously many modifications and variations of the present invention are possible in the light of the above teachings. It is therefore to be understood that within the scope of the appended claims the invention may be practiced otherwise than as specifically described.

What is claimed is:

1. A rocket launcher having a firing tube, a magazine in communication with the firing tube for storing a series of rockets in readiness for firing, means exerting a continuous push on the trailing rocket to tend to displace the rocket series out of the magazine into the firing tube, transfer means operatively associated with the leading rocket and having a piston connected thereto for its forward operation, back-stroke operating means also connected to the transfer means, electrically operative fluid pressure control means for delivering pressure fluid to the cylinder to impart periodic forward power strokes to the piston and its transfer means thereby to cause it to release successive leading rockets, and a control in the firing tube for the electrical portion of the electrically operative fluid pressure control means, being self-closed in the absence of a rocket from the firing tube to cause said power strokes and being openable by succeeding rockets when occupying the firing tube to leave the transfer means free for operation of said back stroke means.

2. A rocket launcher having guide means from which a rocket is projected into space upon being ignited, means for supplying the guide means with rockets at intervals, transfer means operative to align a rocket with the guide means, pressure fluid operated means for imparting periodic power strokes to the transfer means for moving the leading rocket of a series of rockets into igniting position in said guide means, resilient means exercising a constant returning pressure on said transfer means, and means operated by a rocket in its igniting position to suspend operation of the pressure fluid operated means and provide a time interval for unimpeded operation of said resilient means.

3. A rocket launcher having a firing tube, a magazine in communication with the firing tube for storing a series of rockets in readiness for firing, means for exerting a continuous push on the trailing rocket to tend to displace the rocket series out of the magazine into the firing tube, a slide movable in two directions, initially restraining the rocket series, pressure fluid operative means for imparting a power stroke to the slide to move it in one direction thereby to release the leading rocket for transfer into registration with the firing tube, detent means rendered operative by said movement of the slide to hold the remaining rockets of the series, and resilient means operative upon cessation of the power stroke, returning the slide to initial position and releasing the hold of the detent means to enable the continuous push exerting means to advance the rocket series by one rocket.

4. A rocket launcher having a firing tube, a magazine in communication with the firing tube for storing a series of rockets in readiness for firing, means for exerting a continuous push on the trailing rocket to tend to displace the rocket series out of the magazine into the firing tube, a slide confronting the leading rocket, being movable in two directions and initially restraining the rocket series, pressure fluid operative means for imparting a power stroke to the slide to move it in one direction thereby to release the leading rocket for transfer into the firing tube, detent means including pawls so situated as to engage the next leading rocket, means carried by the slide and made operative by its power stroke to displace the detent means into engagement with the next leading rocket to hold the series back, and means also carried by the slide and made operative by its power stroke to force the leading rocket out of the series and into the firing tube.

5. In rocket launching apparatus, a firing chamber having a magazine in communication therewith for storing a series of rockets, a holding pawl for holding the leading rocket from registration with the firing chamber, at least one pusher pawl for pushing the leading rocket into registration with the firing chamber, linkage connected with the pusher pawl for its operation, pneumatic means for actuating the linkage thus to operate the pusher pawl and displace the leading rocket into registration with the firing chamber, an electro-pneumatic valve operable for periodically actuating the pneumatic means for said operation of the linkage, means for retracting the holding pawl from its holding position against the leading rocket immediately prior to its displacement, and means actuated by the leading rocket upon assuming registration with the firing chamber for rendering the electro-pneumatic valve inoperable.

6. A rocket launcher having a firing chamber, a rocket magazine in communication with the firing chamber, extending off from the firing chamber from a position thereabove so that the leading rocket tends to gravitate into the firing chamber, a slide intercepting the leading rocket, means to suddenly displace the slide so as to pull the support from under the rocket, leaving the rocket substantially in position by its inertia and ready for gravitation into the firing chamber, and pusher means operated by the slide simultaneously with its displacement to push down on said rocket and insure its entry into the firing chamber.

7. A rocket launcher having a firing chamber, a rocket magazine in communication with the firing chamber, a slide intercepting the leading rocket of a series of rockets in the magazine, power means to move the slide, an electro-pneumatic valve and a source of pressure fluid controlled thereby, an electrical circuit remotely closeable to energize the electro-pneumatic valve for the activation of the power means and the performance thereby of a power stroke on the slide to release the leading rocket, and switch means operated by said rocket upon entry into the firing chamber to open the circuit for the deenergization of the electro-pneumatic valve and deactivation of the power means in readiness for an idle return stroke of the slide.

8. A rocket launcher having a firing chamber, a rocket magazine in communication with the firing chamber, a pusher slide which includes a pawl operable behind the leading rocket of a series of rockets in the magazine, power means to move the slide, an electro-pneumatic valve and a source of pressure fluid controlled thereby, an electrical circuit remotely closeable to energize the electro-pneumatic valve for the activation of the power means and the performance thereby of a power stroke on the pusher slide to cause the pawl to push the leading rocket into the firing chamber, and twin switches in said electrical circuit, respectively operable by the leading rocket and by the slide, first to ready the switch for interruption and to condition another circuit upon entry of the rocket into the firing chamber, second to again close said other circuit upon the return stroke of the slide upon firing of the rocket whereby to again energize the valve.

GEORGES KUNZ.

REFERENCES CITED

The following references are of record in the file of this patent:

UNITED STATES PATENTS

| Number | Name | Date |
|---|---|---|
| 2,088,503 | Broussard | July 27, 1937 |
| 2,116,860 | Blaylock et al. | May 10, 1938 |
| 2,440,634 | Henney | Apr. 27, 1948 |
| 2,450,951 | Goodhue et al. | Oct. 12, 1948 |
| 2,451,522 | Uhl et al. | Oct. 19, 1948 |
| 2,459,314 | Goodhue | Jan. 18, 1949 |
| 2,464,920 | Carter | Mar. 22, 1949 |
| 2,485,715 | Eastman | Oct. 25, 1949 |

FOREIGN PATENTS

| Number | Country | Date |
|---|---|---|
| 494,842 | France | June 10, 1919 |
| 79,716 | Austria | Jan. 10, 1920 |